(12) United States Patent
Crus et al.

(10) Patent No.: US 6,542,904 B2
(45) Date of Patent: Apr. 1, 2003

(54) METHOD AND SYSTEM FOR EFFICIENTLY PROVIDING MAINTENANCE ACTIVITY ON A RELATIONAL DATABASE THAT IS UTILIZED WITHIN A PROCESSING SYSTEM

(75) Inventors: Richard A. Crus, San Jose, CA (US); Curt Lee Cotner, Gilroy, CA (US); Harry Otto Radke, San Jose, CA (US); Brian Keith Howell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,645

(22) Filed: Jul. 30, 1999

(65) Prior Publication Data

US 2002/0152188 A1 Oct. 17, 2002

(51) Int. Cl.$^7$ .............................................. G06F 17/30
(52) U.S. Cl. .................... 707/200; 707/201; 707/202
(58) Field of Search ................................ 707/200, 201, 707/202, 203, 204, 205, 10, 4, 1

(56) References Cited

U.S. PATENT DOCUMENTS

| | | | |
|---|---|---|---|
| 4,970,640 A | | 11/1990 | Beardsley et al. .......... 710/104 |
| 5,226,158 A | * | 7/1993 | Horn et al. .................. 707/201 |
| 5,675,779 A | * | 10/1997 | Doktor .......................... 707/4 |
| 5,692,182 A | | 11/1997 | Desai et al. .................. 707/10 |
| 5,721,915 A | | 2/1998 | Sockut et al. ................ 707/200 |
| 5,724,575 A | * | 3/1998 | Hoover et al. ................. 707/10 |
| 5,745,753 A | * | 4/1998 | Mosher, Jr. .................. 707/202 |
| 5,754,771 A | | 5/1998 | Epperson et al. ........... 709/203 |
| 5,787,415 A | | 7/1998 | Jacobson et al. .............. 707/2 |
| 5,884,297 A | * | 3/1999 | Noven ........................... 707/1 |
| 6,065,018 A | * | 5/2000 | Beier et al. ................. 707/202 |
| 6,199,074 B1 | * | 3/2001 | Kern et al. .................. 707/204 |
| 6,202,071 B1 | * | 3/2001 | Keene ......................... 707/202 |

* cited by examiner

Primary Examiner—Sanjiv Shah
(74) Attorney, Agent, or Firm—Sawyer Law Group LLP

(57) ABSTRACT

A method and system for efficiently providing maintenance activity on a relational database that is utilized within a processing system is disclosed. The relational database includes a pool of threads and a plurality of resources. The pool of threads receive requests from a plurality of clients and control the plurality of resources. The method and system comprise determining that a maintenance activity is required and providing a first command that initiates a first process which terminates all threads in the pool of threads if the maintenance activity is required. The method and system further include providing a second command which initiates a second process after the maintenance activity has completed which causes the threads to be created and initiates the processing of requests. A system and method in accordance with the present invention based upon the determination that a maintenance activity is required causes the pool threads within a relational database to terminate and thus free up resources but also allows the connections from the clients to persist. Once the relational database resources are freed, the maintenance activity is performed, and thereafter distributed relational database processing is resumed.

18 Claims, 3 Drawing Sheets

METHOD AND SYSTEM FOR EFFICIENTLY PROVIDING MAINTENANCE ACTIVITY ON A RELATIONAL DATABASE THAT IS UTILIZED WITHIN A PROCESSING SYSTEM

FIELD OF THE INVENTION

The present invention relates generally to database maintenance and more particularly to a system and method for efficiently maintaining a relational database in a processing system.

BACKGROUND OF THE INVENTION

With the popularity and convenience of network computer systems, data sharing among users through databases has become common in many business environments. Providing central access to information via databases requires careful consideration of database maintenance and management. Further, it is important to provide maintenance to the database while minimizing the affect on the overall performance of the system. Typically in such a system, there are a plurality of clients which have connections to a pool of threads. Each of the threads in the pool of threads is connected to the relational database. Typically when a connection is made from a client, the connection cannot be broken until after a particular activity/request is completed. Accordingly, a particular pool thread that is connected to the relational database may hold resources that block some of the maintenance activities from completing. For example, a data definition request is one type of maintenance activity that may modify the relational database that could be blocked from completing.

One way to perform maintenance activities is to get rid of all of the connections from the client to the resources. The problem with this solution is that it affects the overall performance of the system, because of the cost of terminating the connections as well as the cost of re-establishing the connections after the maintenance activity has completed. Accordingly, what is needed is a system and method for maintaining a relational database while minimizing the impact on the overall performance of the processing system. The system should be easy to implement and be cost effective, and should not require significant modification of existing systems. The present invention addresses such a need.

SUMMARY OF THE INVENTION

A method and system for efficiently providing maintenance activity on a relational database that is utilized within a processing system is disclosed. The relational database includes a pool of threads and a plurality of resources. The pool of threads receive requests from a plurality of clients and control the plurality of resources. The method and system comprise determining that a maintenance activity is required and providing a first command that initiates a first process which terminates all threads in the pool of threads if the maintenance activity is required. The method and system further include providing a second command which initiates a second process after the maintenance activity has completed which causes the threads to be created and initiates the processing of requests.

A system and method in accordance with the present invention based upon the determination that a maintenance activity is required causes the pool threads within a relational database to terminate and thus free up resources but also allows the connections from the clients to persist. Once the relational database resources are freed, the maintenance activity is performed, and thereafter distributed relational database processing is resumed.

DETAILED DESCRIPTION

The present invention relates to the maintenance of relational databases. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Hardware Environment

Figure 1:
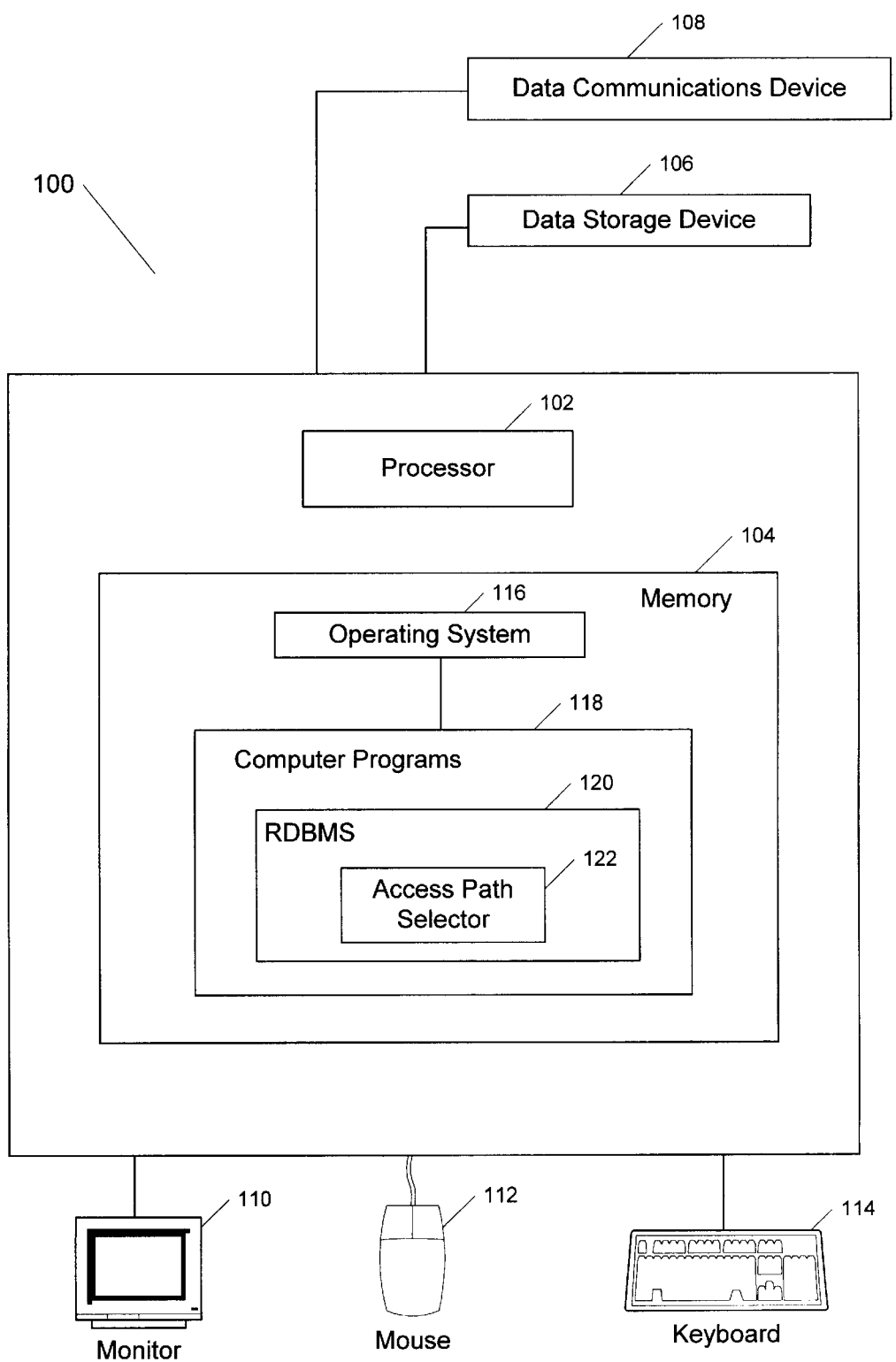
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read-only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS®, AIX®, OS/2®, WINDOWS NT®, WINDOWS®, UNIX®, etc. The operating system 116 is booted into the memory 104 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself. In particular, the present invention is typically implemented using relational database management system (RDBMS) software 120, such as the DB2® product sold by IBM Corporation, although it may be implemented with any database management system (DBMS) software.

The RDBMS software 120 receives commands from users for performing various search and retrieval functions, termed queries, against one or more databases stored in the data storage devices 106. In the preferred embodiment, these queries conform to the Structured Query Language (SQL) standard, although other types of queries could also be used without departing from the scope of the invention. The queries invoke functions performed by the RDBMS software 120, such as definition, access control, interpretation, compilation, database retrieval, and update of user and system data. The RDBMS software 120 invokes the access path selector 122 to select an optimized access path.

The operating system 116 and computer programs 118 are comprised of instructions which, when read and executed by the computer 100, cause the computer 100 to perform the steps necessary to implement and/or use the present invention. Generally, the operating system 116 and/or computer programs 118 are tangibly embodied in and/or readable from a device, carrier, or media, such as memory 104, data storage devices 106, and/or data communications devices 108. Under control of the operating system 116, the computer programs 118 may be loaded from the memory 104, data storage devices 106, and/or data communications devices 108 into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

A method and system for efficiently providing maintenance activity on a relational database in a processing system is provided. A system and method in accordance with the present invention accomplishes this through the use of first and second commands initiating first and second processes. A first command initiates a process within the database which efficiently suspends operation of the processing system and then allows the maintenance activity to take place. Thereafter, a second command initiates a second process after the maintenance activity is completed. The second process resumes operation of the processing system. To more particularly describe the features of the present invention refer now to the following description in conjunction with the accompanying figures.

Figure 2:
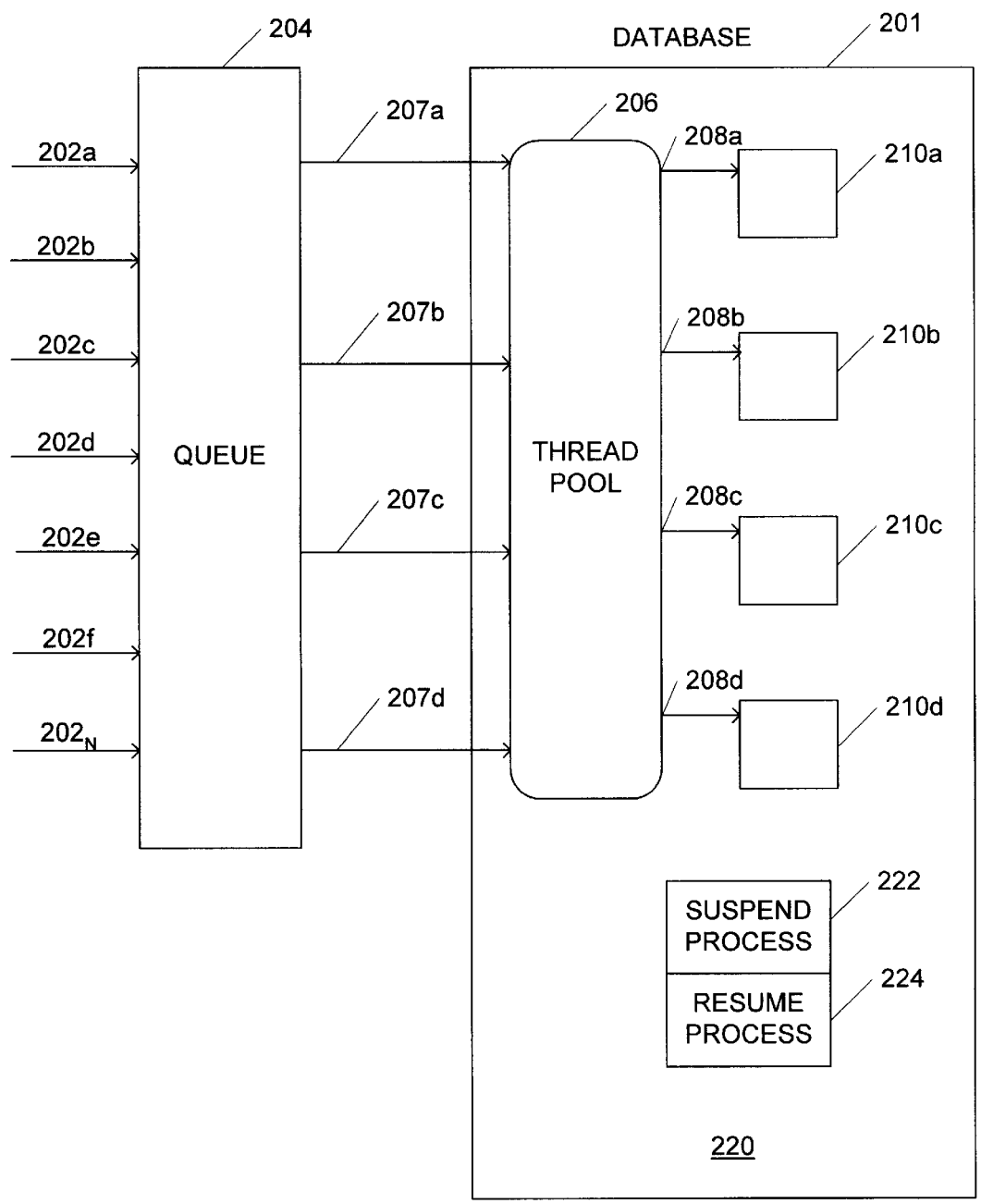
FIG. 2 is a block diagram of a system which utilizes the present invention.

FIG. 2 is a simple block diagram of a system in accordance with the present invention. A system and method in accordance with the present invention allows the performance of maintenance activity on a database while minimally affecting the operation of the processing system associated therewith. As is seen, the system 200 includes a database 201 and queue 204 coupled to the database 201 for receiving a plurality of requests 202a–202n from a plurality of clients and providing these requests to the database via lines 207a–207b. The database 201 includes a plurality of resources 210a through 210d and a pool of threads 206 which are coupled to the resources via connections 208a through 208d. Typically there are more requests than threads in the pool of threads 206. Therefore, the queue 204 holds these requests from the clients until a resource 210a–210d is available.

Also located within the database are two processes: a suspend process 222 and a resume process 224. The suspend process 222 responds to a first command that indicates a maintenance activity is required to suspend operation of the database 201 either automatically or based upon operator input. The suspend process 222 allows the processing system to efficiently terminate all of the threads within the pool of threads and therefore unlock all of the resources 210a–210d. After all of the threads of the pool of threads 206 are terminated, the desired maintenance activity then takes place. After the maintenance activity has ended, then a second command is provided to the database 201 that initiates the resume process 224 either automatically or by an operator. The resume process causes pool threads to be created and initiates the processing of requests that were queued earlier.

Figure 3:
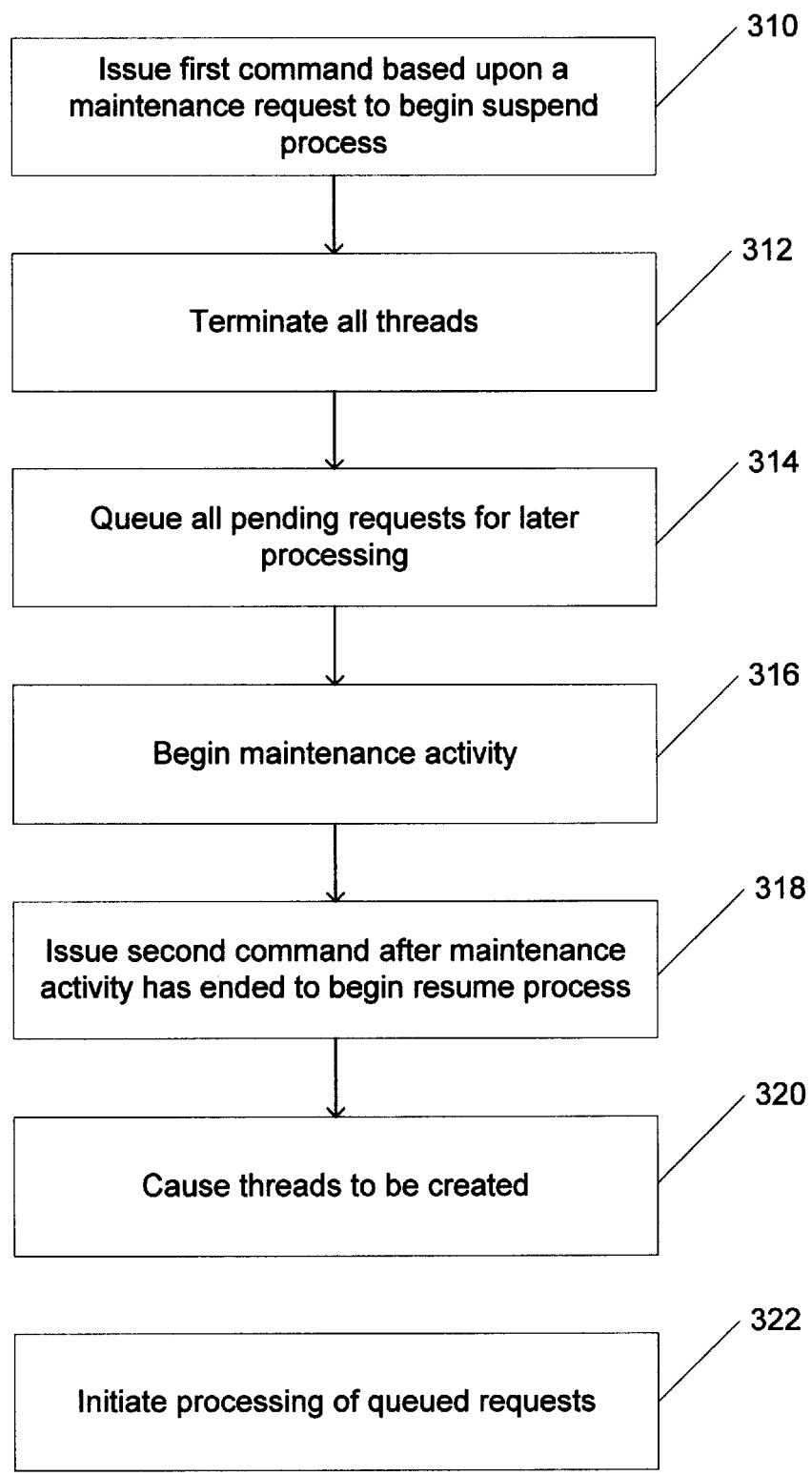
FIG. 3 is a flow chart illustrating the operation of the present invention.

To describe the present invention in more detail, refer now to FIG. 3 in conjunction with the accompanying description. FIG. 3 is a flow chart illustrating the operation of the present invention. Initially a first command is issued based upon a maintenance request, via step 310. The first command causes a suspend process to be initiated in which all threads in the pool of threads are terminated, via step 312. The suspend process also causes all requests received from clients to be queued for later processing, via step 314. Thereafter, the requested maintenance activity is initiated, via step 316. Next, after the maintenance activity has ended, a second command is issued either by an operator or automatically which initiates a resume process, via step 318. The resume process then causes each of the threads of the pool of threads to be created, via step 320, and also initiates the processing of the queued requests based upon the end of the maintenance activity, via step 322. The queued requests are processed preferably in the order that they are received.

A system and method in accordance with the present invention based upon the determination that a maintenance activity is required causes the pool threads within a relational database to terminate and thus free up resources but also allows the connections from the clients to persist. Once the relational database resources are freed, the maintenance activity is performed, and thereafter distributed relational database processing is resumed. In a system and method in accordance with the present invention, two commands are defined: (1) the first command initiates a suspend process that causes all pool threads to terminate and also causes all requests received from clients to be queued for processing later (various types of maintenance activity may then be activated); and (2) the second command initiates a resume process which causes pool threads to be created and initiates the processing of requests that were queued earlier (requests received after the command is initiated are processed in the order received).

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for efficiently providing maintenance activity on a relational database that is utilized within a processing system, the relational database including a pool of threads and a plurality of resources, the pool of threads receiving requests from a plurality of clients and for controlling the plurality of resources, the method comprising the steps of:

(a) determining that a maintenance activity is required;

(b) providing a first command if the maintenance activity is required that initiates a first process which terminates all threads in the pool of threads; and (c) providing a second command which initiates a second process after the maintenance activity has completed which causes the threads to be created.

2. The method of claim 1 wherein the first process comprises a suspend process.

3. The method of claim 2 wherein the second process comprises a resume process.

4. The method of claim 1 in which the first command providing step (b) further includes the step of (b1) storing pending requests in a queue after the first process is initiated.

5. The method of claim 4 in which the second command providing step (c) further includes the step (c1) of processing the pending requests after the second process is initiated.

6. The method of claim 5 wherein the pending requests are processed in the order they are received in the queue.

7. A computer readable medium containing program instructions for efficiently providing maintenance activity on a relational database that is utilized within a processing system, the relational database including a pool of threads and a plurality of resources, the pool of threads receiving requests from a plurality of clients and for controlling the plurality of resources, the program instructions for:

(a) determining that a maintenance activity is required;

(b) providing a first command if the maintenance activity is required that initiates a first process which terminates all threads in the pool of threads; and (c) providing a second command which initiates a second process after the maintenance activity has completed which causes the threads to be created.

8. The computer readable medium of claim 7 wherein the first process comprises a suspend process.

9. The computer readable medium of claim 8 wherein the second process comprises a resume process.

10. The computer readable medium of claim 8 in which the second command providing instruction (c) further includes instruction for (c1) processing the pending requests after the second process is initiated.

11. The computer readable medium of claim 10 wherein the pending requests are processed in the order they are received in the queue.

12. The computer readable medium of claim 7 in which the first command providing instruction (b) further includes instructions for (b1) storing pending requests in a queue after the first process is initiated.

13. A system for efficiently providing maintenance activity on a relational database that is utilized within a processing system, the relational database including a pool of threads and a plurality of resources, the pool of threads receiving requests from a plurality of clients and for controlling the plurality of resources, the system comprising:

means for determining that a maintenance activity is required;

means for providing a first command if the maintenance activity is required that initiates a first process which terminates all threads in the pool of threads; and means for providing a second command which initiates a second process after the maintenance activity has completed which causes the threads to be created.

14. The system of claim 13 wherein the first process comprises a suspend process.

15. The system of claim 14 wherein the second process comprises a resume process.

16. The system of claim 13 in which the first command providing means further includes the means for storing pending requests in a queue after the first process is initiated.

17. The system of claim 16 in which the second command providing means further includes the means for processing the pending requests after the second process is initiated.

18. The system of claim 17 wherein the pending requests are processed in the order they are received in the queue.

* * * * *